Nov. 20, 1956  J. W. E. EDMONSON  2,771,592

DETECTING AND RECORDING SYSTEM FOR SEISMIC WAVES

Filed Jan. 9, 1953

Jack W. E. Edmonson
INVENTOR.

BY *Clarence A. O'Brien*
*and Harvey B. Jackson*
Attorneys

United States Patent Office 2,771,592
Patented Nov. 20, 1956

2,771,592

DETECTING AND RECORDING SYSTEM FOR SEISMIC WAVES

Jack W. E. Edmonson, San Antonio, Tex.

Application January 9, 1953, Serial No. 330,568

4 Claims. (Cl. 340—17)

This invention relates to a system and apparatus for detecting and recording vibrations especially those caused by compressional waves, the detecting of such waves being obtained by means of the spatial displacement of a member which produces a variation of the capacity of an electric system. The resulting changes in capacity are then used to produce signals which are recorded.

Compressional waves may either be produced by sound, or by explosions, or by natural or artificial earthquakes, the latter producing seismic waves traveling through the earth which may be detected. The detection and recording of seismic disturbances by seismometers either serves scientific purposes or, if the seismic waves are produced artificially, the main purpose of the instrument is the geological exploration of subterranean formations.

Especially when used for the last named purpose and also in connection with the other purposes which will be mentioned the energy which is picked up by the instrument may vary considerably and cover a considerable range. In almost all types of instruments the compressional wave, by means of an electrical transducer, is converted into an electrical wave or fluctuation which is then amplified and the amplified wave or fluctuation is then recorded. With the magnitude of the disturbance received, the input into the amplifier and therefore also the amplifier output varies considerably, with the result that a recording above the energy level for which the instrument is adjusted, is either not possible or is distorted to such an extent that the results are no longer usable or require the application of a correction process.

While this disadvantage can be partly corrected by using suitable, although complex, amplitude compressing electronic equipment, it is, of course, a great advantage to be able to make the recording with a simple instrument which introduces less distortion. This is especially of advantage in connection with seismometers used for exploration purposes.

It is therefore the principal object of the invention to provide a seismometer which permits the recording or registering of disturbances of widely different magnitude approximately in the same way.

It is a further principal object of the invention to provide a seismometer connected with an amplification and recording device in which the energy level of the input of the amplification and recording device is maintained at an approximately even height.

More specifically, it is an object of the invention to provide a seismometer in which the seismic waves are translated into electrical fluctuations by means of a variable capacity, influenced by the seismic disturbance, which variable capacity causes current fluctuations to be amplified and recorded in the same way whether the disturbances due to the seismic waves are large or small.

It is a further object of the invention to provide a capacitive transducing element for converting mechanical oscillations into electrical oscillations which element furnishes approximately equal energy fluctuations for all disturbances, thus maintaining the energy input and output of the amplifying and recording instrument approximately at a constant level.

It is a further object of the invention to provide a composite capacitive transducing element which produces changes of capacity of the same relative magnitude or approximately the same percentage of capacity fluctuation for a given amplitude ratio whatever the absolute level of the disturbing vibration which is received.

According to the invention, therefore, a capacitive detection system is used for translating the movement of the movable element of the instrument into variations of the capacity of an electrical system, feeding the input of an amplifier used for signal recording, said capacitive system containing movable elements producing capacity variations of the same relative magnitude, whatever the magnitude of the disturbance producing the relative movement of the movable member of the seismometric instrument relatively to the fixed member of the instrument.

To obtain this result the capacitive transducer includes condenser plates which are movable relative to each other which comprise a plurality of condenser elements, all connected in parallel, but of different widths, the relative movement of such composite capacitive elements producing approximately the same energy fluctuation in the electrical system whatever the magnitude of the disturbance.

More detailed objects of the invention will be described in the following detailed specification.

The invention is illustrated in the accompanying drawing in a diagrammatic manner by way of example. It is however to be understood that the example shown in the drawing has been selected in order to illustrate diagrammatically the principle of the invention and the best mode of applying said principle, but that the specific example shown is not to be considered as limitative so that a departure from the example illustrated in the drawing is not necessarily to be considered as a departure from the principle of the invention.

Figure 1:
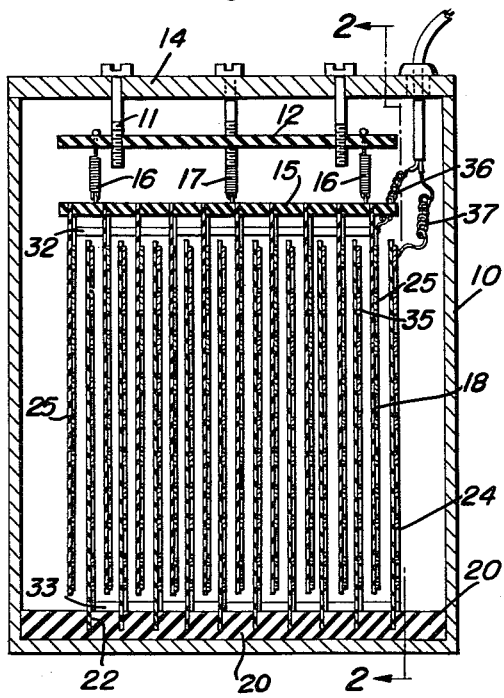
Figure 1 is a sectional elevational view, illustrating diagrammatically one embodiment of the invention, the section being taken along the line 1—1 of Figure 2.
Figure 2:
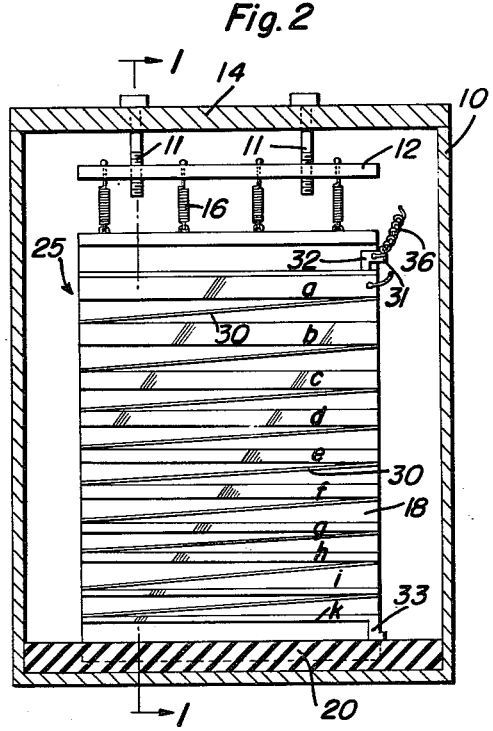
Figure 2 is a sectional elevational view of the same embodiment of the invention, the section being taken along line 2—2 of Figure 1.

The invention is illustrated as being applied to a seismometer and more specifically to a seismometer for geological exploration.

The seismometer, as well known, consists of two relatively movable masses, one of said masses being connected with the ground through which the seismic disturbance is received, the other mass being suspended by means of springs or by other resilient means, which mass by virtue of its inertia tends to remain at rest, while the mass connected with the ground oscillates. It will be clear however, that the instrument may also be used for recording the wave form of vibrations of any other type for instance, the wave form of vibrations which are caused by machinery, by the passage of trains or trucks, or which are the result of other influences manifesting themselves in industrial or other processes.

According to the invention the oscillation is recorded by capacity changes which are produced by the relative movement of the two masses by connecting said masses with a number of variable capacitances each consisting of a number of composite elements.

The detecting element of the seismometer or other detector of vibrations comprisis a box-like closed casing 10 within which a supporting plate 12 is held by means of screw bolts 11 which are fixed on the top or cover of the casing 10. A resiliently held suspension plate 15 is suspended on the supporting plate by means of coil springs 16. To this suspension plate a number of carrier sheets 18 for condenser plates are fixed, said carrier sheets forming one series. The upper end position of the suspension plate 15 may be determined by means of a finely adjustable screw 17 the end of which is applied against the suspension plate. The adjustment of the screw bolt 17 determines the original tension of the springs 16.

On the bottom of the casing 10 a bottom plate 20 is fixedly held which also holds a number of carrier sheets 24 for condenser plates which form a second series co-operating with the first series. The sheets of both series are so spaced that between the carrier sheets of one series the carrier sheets of the other series may enter. These carrier sheets therefore face each other practically along their entire area.

The carrier sheets for the condenser plates of the series may be fixed to the bottom plate and to the suspension plate in any suitable manner. In the bottom plate, for instance, the carrier sheets are fixed by means of slots 22 which are provided in the bottom plate into which the carrier sheets are inserted.

The carrier sheets 18 and 24 for the condenser plates are preferably thin sheets of insulating material such as paper or plastic and each sheet carries at least one composite condenser plate 25 or 35 of conducting material, or two such plates, facing the plate on the adjacent carrier sheet across the air gap between the carriers. Each condenser plate 25 or 35 consists of a series of plate elements $a, b, c \ldots i, k$, the different elements being of different widths. For instance, in the example shown the width of the plate elements $a$ of one of the plates 25 is considerable, but the width of these elements in the example shown diminishes constantly from plate to plate element so that the plate element $b$ is narrower than the plate element $a$ and the following elements are each narrower than the preceding one if one proceeds from one element to the other. The last plate element $k$ is therefore reduced to a very narrow strip. The arrangement in a series of diminishing width is however arbitrary, the important new step being merely to provide plate elements of different width, while their arrangement may be made in any suitable manner.

The entire series of plate elements on one carrier sheet 18 or 24 forms however a single condenser plate, as all the plate elements are conductively connected with each other by wires 30. The wires are diagonally disposed, because when arranged in this way they may act by themselves as plate elements, in the manner described below.

The carrier sheets 24 have a similar arrangement of condenser plates 35 consisting of conducting elements of unequal widths. The arrangement on two adjacent carrier sheets 18 and 24 facing each other, one fixed to the bottom plate 20 of the casing and the other fixed to the suspension plate 15, is always identical, so that in the position of rest each plate element on one carrier sheet faces an identical element on the adjacent carrier sheet. The elements 35 on the carrier sheets 24 are connected with each other in the same way in which the elements 25 on carrier sheets 18 are connected, namely by means of diagonally disposed wires which may face each other and form part of the condenser plate.

In the position of rest, for example, the capacity of the condenser therefore corresponds to that of the sum total of the elemental areas 25 or 35.

The condenser plates 25 and 35 of the condenser may be arranged in parallel or in series, but a parallel arrangement is usually preferable and is illustrated in the drawing. Metallic strips 32, 33 run transversely of the plates and all the condenser plates 25, 35 may be connected to such a transverse strip. The strip 32 connecting the condenser plates 25 may further be provided with a connecting lug 31. Each of the condenser plates 25, 35 is connected by means of a wired connection 36, 37 with the remainder of the instruments. The wire 37 may be soldered to the lug 31.

Figure 3:
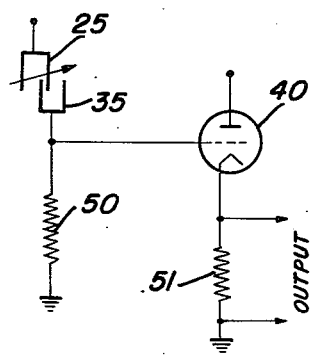
Figure 3 is a diagrammatic view showing the connection of the capacitive element illustrated in Figures 1 and 2 with an amplifier, and more specifically a cathode follower producing the necessary amplification of the capacitive fluctuations due to the disturbance.
Figure 4:
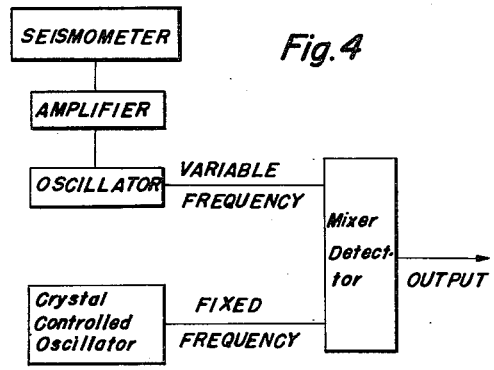
Figure 4 is a block diagram illustrating the relative connection of the elements of a complete instrument.

One example of such a connection is diagrammatically indicated in Figure 4 by means of a block diagram. The variable condenser 25, 35 of the seismometer is connected to the grid of a cathode follower 40 (Figure 3) which has a low impedance output and which is therefore particularly suitable for this type of instrument. The condenser is connected with the grid of the cathode follower and the grid connection may be grounded over a resistance 50. The grounded cathode of the cathode follower, in the well known manner, is provided with a resistance 51 across which the output lines are connected. Further amplification may take place and the amplified fluctuations finally control an oscillator whose frequency is variable and varies in accordance with the fluctuations which are fed to it. The variable frequency is fed to a mixer detector and the said mixer detector is also supplied by the constant frequency of a further crystal controlled oscillator. The output of the mixer may then be directly used for operating a stylus or other writing implement tracing the wave shape of the received oscillations or vibrations which are due to the disturbance of a seismic or other character or which are due to vibrations, on a graduated paper web or pad (not shown).

Upon the occurrence of a seismic disturbance, the two condenser plates 25, 35 move relatively to each other and the elements $a, b, c \ldots i, k$ facing each other are displaced relatively to each other. If the displacement is small, for instance, the strips $k$ of the condenser plates 25 and 35 or the strips $k, i \ldots$ will be displaced to such an extent that the capacity due to their presence becomes small or even negligible. The strips $a$ of the condenser plates 25, 35 have also been displaced but the displacement of these strips is so small relatively to their width that a change of capacity is not noticeable.

The total change of capacity occurring upon such a small displacement will however have a certain definite minimum value owing to the marked decrease of the capacity of some of the strips such as the strip $k$, accompanied by a smaller decrease in the adjacent strips which however on account of the small width of the adjacent strips is still very marked. The change of capacity in the condenser therefore corresponds approximately to the share of the strip $k$ to which the change in adjacent strips is added.

If the displacement is large, many of the strips will have moved to a position in which the capacity is decreased to a negligible value, but the decrease of capacity which is due to the relative displacement of the strips $a$ of condenser plates 25, 35 will still be relatively small when compared with the capacity of these strips $a$.

The capacity of the condenser therefore merely varies between these two values and it is possible to make the variations small and especially to reduce the variations to such a small extent that it will always remain within the limits of amplification of the amplifier to which the capacitive fluctuations are fed so that linear reproductions of the wave form occurs.

It will also be clear that if diagonal wires are used instead of wires directly connecting the condenser plate elements, these diagonal wires will act like strips of a small width and will therefore have a certain capacity in the position of rest which capacity will be reduced to a negligible value upon movement of the two condenser plates relatively to each other.

It will further be understood that the drawing does not show correct proportions and that reflection seismographs, for instance, will have to be provided with strip elements which are much smaller than those which are shown in the drawings.

On the other hand, it is also possible to use the same principles for the detection of vibrations occurring in industrial plants, in machines or objects near machines and in such a case, the vibrations being large, the wider strips would have to be widened considerably in order to obtain the desired result.

It will further be understood that the unessential elements in the embodiment of the invention which have been described and shown diagrammatically may be changed without in any way departing from the essence of the invention as defined in the annexed claims.

What is claimed as new is as follows:

1. A capacitive seismometer comprising a stationary housing, a condenser having condenser electrodes facing each other across a dielectric, each electrode consisting of a series of spaced electrically connected electrode strips, a stationary condenser electrode carrier, carrying one series of spaced electrode strips, means for mounting the stationary condenser electrode carrier fixedly in the stationary housing, a movable electrode carrier, carrying a series of spaced electrode strips facing the aforesaid series carried by the fixed electrode carrier, means for mounting the said movable condenser electrode carrier resiliently for free oscillation in a plane parallel to the fixed electrode carrier, said spaced electrode strips extending substantially transversely with respect to the direction of said oscillatory movement, the width of the individual electrode strips of each series in the direction of movement differing from each other, pairs of facing strips being of substantially equal width so that equal displacement from any point in its normal range of movement of the resiliently mounted electrode carrier induces different capacity changes in the pairs of electrode strips carried by the condenser electrode carriers facing each other, resulting in a more uniform rate of capacity change for movements with different amplitude.

2. A capacitive seismometer as claimed in claim 1 wherein the width of the electrode strips facing each other is equal while the spacing between adjacent electrode strips carried by the same electrode carrier plates is larger than the width of one of said adjacent electrode strips.

3. A capacitive seismometer as claimed in claim 1 wherein the electrode strips on each condenser electrode carrier are connected with each other by connecting wires running in a direction substantially transverse with respect to the direction of relative movement of the said condenser electrode carrier, connecting wires on a stationary and a movable condenser electrode carrier facing each other, so as to form part of the condenser electrodes.

4. A capacitive seismometer comprising a stationary housing, a group of insulating spaced movable condenser electrode carrier plates and a group of insulating stationary condenser electrode carrier plates, means for mounting the movable condenser electrode carrier plate resiliently for oscillating movement of one plate relatively to the stationary housing, and means for mounting the stationary condenser electrode carrier plate fixedly in the housing, the electrode carrier plates of the two groups being interleaved, with the plates of one group, being placed into the space between the plates of the other groups, each electrode carrier plate carrying a number of separate electrically interconnected spaced metallic strips of different widths, arranged transversely with respect to the direction of relative movement of the groups of plates, the electrode strips on an insulating condenser electrode carrier plate of one group facing, in the position of rest, the strips carried by the other group of insulating condenser electrode carrier plates, strips facing each other being of equal width, thus cooperating to produce a predetermined capacity which changes with the movement imparted to one of the groups, the capacity change being determined by the extent of the shift of one group of condenser electrode carrier plates relatively to the other group of such plates, the different width of the strips limiting the range of the capacity change occurring with widely different relative movements of the two groups of plates.

References Cited in the file of this patent

UNITED STATES PATENTS

| 2,476,930 | Towle | July 19, 1949 |
| 2,571,026 | Fruithof | Oct. 9, 1951 |
| 2,599,775 | Peterson | June 10, 1952 |
| 2,638,578 | Piety | May 12, 1953 |
| 2,653,306 | Piety | Sept. 22, 1953 |
| 2,659,064 | Piety | Nov. 10, 1953 |

FOREIGN PATENTS

| 511,042 | Great Britain | Aug. 9, 1939 |
| 425,329 | Great Britain | Mar. 12, 1935 |